(12) United States Patent
Vandervort et al.

(10) Patent No.: US 10,699,355 B2
(45) Date of Patent: Jun. 30, 2020

(54) SYSTEM AND METHOD FOR GENERATING AN AGGREGATE DOCUMENT COMPRISED OF AT LEAST ONE SUB-DOCUMENT

(71) Applicant: XEROX CORPORATION, Norwalk, CT (US)

(72) Inventors: David Russell Vandervort, Walworth, NY (US); Venkatesh Guru Rao, Seattle, WA (US); Jesse Silverstein, New York, NY (US)

(73) Assignee: Xerox Corporation, Norwalk, CT (US)

( * ) Notice: Subject to any disclaimer, the term of this patent is extended or adjusted under 35 U.S.C. 154(b) by 789 days.

(21) Appl. No.: 15/234,534

(22) Filed: Aug. 11, 2016

(65) Prior Publication Data

US 2016/0350887 A1 Dec. 1, 2016

Related U.S. Application Data

(62) Division of application No. 13/232,283, filed on Sep. 14, 2011, now abandoned.

(51) Int. Cl.
| | |
|---|---|
| *G06Q 50/18* | (2012.01) |
| *G06F 16/93* | (2019.01) |
| *G06F 21/10* | (2013.01) |
| *G06Q 10/10* | (2012.01) |

(52) U.S. Cl.
CPC ............ *G06Q 50/184* (2013.01); *G06F 16/93* (2019.01); *G06F 21/10* (2013.01)

(58) Field of Classification Search
None
See application file for complete search history.

(56) References Cited

U.S. PATENT DOCUMENTS

| 7,475,246 B1 | 1/2009 | Moskowitz et al. | |
|---|---|---|---|
| 2005/0050446 A1* | 3/2005 | Miura | G06F 21/10 |
| | | | 380/203 |
| 2005/0278258 A1* | 12/2005 | O'Donnell | G06Q 30/06 |
| | | | 705/59 |
| 2008/0106772 A1 | 5/2008 | Ko | |

(Continued)

OTHER PUBLICATIONS

Specification from U.S. Appl. No. 11/521,763, which is the parent application of Jang et al.*

*Primary Examiner* — Julie M Shanker
(74) *Attorney, Agent, or Firm* — Budzyn IP Law, LLC (57) ABSTRACT

A system and method for generating an aggregate document comprised of at least one sub-document. The system comprises a document management system on a first computing device connectable over a network with a user computing system on a second computing device remote from the first computing device. The document management system on the first computing device has access over the network to a plurality of databases including an aggregate document database, a license database, and a document repository database. Each of the first computing device and the second computing device have software code operationally installed thereon for effecting instructions for controlling certain aspects of each computing device. The software code on the first computing device is operational at least for controlling hardware components of the first computing device to create a builder subsystem configured to enable a user to generate at least one aggregate document.

9 Claims, 5 Drawing Sheets

(56) References Cited

U.S. PATENT DOCUMENTS

2011/0078041 A1* 3/2011 Barker .................... G06F 21/10
705/26.25
2015/0020153 A1* 1/2015 Jang ........................ G06F 21/10
726/1

* cited by examiner

SYSTEM AND METHOD FOR GENERATING AN AGGREGATE DOCUMENT COMPRISED OF AT LEAST ONE SUB-DOCUMENT

CROSS-REFERENCE TO RELATED APPLICATIONS

This application claims priority to currently pending U.S. patent application Ser. No. 13/232,283, filed on Sep. 14, 2011, and published as U.S. Patent Application Publication Number US 2013/0066792 A1.

FIELD

The present application is directed to a system and method of creating an aggregate document.

BRIEF DISCUSSION OF RELATED ART

Traditional copyright restricts the use of copyrighted works, such as software. However, copyright owners have always been able to give permission to use their works on a case-by-case basis, usually in return for payment. There has also been a long tradition of some copyright owners allowing their works to be used for academic purposes for reduced payment or even for free. Accordingly, the right of copyright owners to agree to certain uses (or licenses) of their works is well established.

The "open source" movement, which draws on talents of volunteers to develop software that can be shared by all, pioneered the creation of sharing licenses that go beyond standard copyright in what others are allowed to do with the software. These licenses, originating as they do from owners of the work, supersede the copyright for the work by specifying conditions under which the software can be used by others.

The GNU project's General Public License (GPL) was one of the first licenses to value freedom of use over an individual author's control. The GPL allows others to freely modify software written under the GPL and use the software as they like. However, GPL requires that, if such modified software is redistributed, the redistributed software must also be covered under the GPL. In effect, this license does not only grant freedom of use, it requires it.

There are many variants of licenses that grant the ability to modify and redistribute the software, with terms that vary widely from the GPL. For example, the Mozilla Public License requires that when software covered by the license is modified and redistributed, the redistributed software must include a file that contains a list of the modifications made to the software. As another example, the PHP license (version 3) allows modification of the software, but places restrictions on the use of the name PHP in the redistribution of the software.

There are also a number of licenses that apply to written work other than software. The so-called "copyleft" licenses that typically allow or restrict the creation of derivative works from the original work, require that the original author be given credit, and specify whether the granted rights apply to commercial, non-commercial, academic or any uses. An example of a copyleft license is the Academic Free License, which permits translations, adaptations and even public performances of works created under it.

A popular collection of licenses is held under the rubric of the Creative Commons, which classifies the licenses for the rights they grant to end users. For example, the "no derivative works" license allows works to be freely copied but not altered in any way. The terms of licenses under the Creative Commons can be combined to meet the needs of almost any author.

Though there are variations of open sharing licenses, most works are still published without explicit licenses. In these cases, standard copyright applies by default.

With the advent and proliferation of the Internet, various documents—such as web pages from different sources—can be combined into a single printable (aggregate) document. Meanwhile, the "open source" and "copyleft" movements have spawned a wide variety of ways in which copyright terms are modified by author-specified licensing terms that make re-use of documents possible outside the normal boundaries of copyright. However, these licensing terms often require specific forms of attribution or restrict copying to certain types of uses, such as to academic or noncommercial uses.

Accordingly, when documents (e.g., web pages) or other materials from different sources are combined into an aggregate document, as is increasingly the case, there are important concerns about copyright and licensing issues. Specifically, there may be many different sets of usage requirements that must be obeyed or at least reported. Sometimes, terms of different licenses may not even be compatible, in which case the document must be changed somehow to remove the conflict. The terms of different licenses represents a management problem, which untrained end users cannot be expected to understand or deal with manually and which presents a substantial burden for the end users. Moreover, violation of copyright or even of open license terms can result in expensive legal actions and significant penalties.

SUMMARY

In accordance with an embodiment, a method of managing licensing information associated with aggregate documents is disclosed. In accordance with the method, a selection of an aggregate document that includes at least one associated sub-document is received. Each of the at least one sub-document is associated with at least one copyright flag. A sub-document is selected from the at least one sub-document. A copyright flag is selected from the at least one copyright flag associated with the selected sub-document. It is determined whether the selected copyright flag is resolved. The selected sub-document is exported to an export document capable of being transmitted to a computing system associated with a user if it is determined that the selected copyright flag is resolved.

In accordance with another embodiment, a system to manage licensing information associated with an aggregate document is disclosed. The system includes an aggregate document search engine, sub-document selector, flag selector, license compliance engine, and export document generator. The aggregate document search engine is configured to receive a selection of an aggregate document that includes at least one associated sub-document. Each of the at least one sub-document is associated with at least one copyright flag. The sub-document selector is configured to select a sub-document from the at least one sub-document. The flag selector is configured to select a copyright flag from the at least one copyright flag associated with the selected sub-document. The license compliance engine is configured to determine whether the selected copyright flag is resolved. The export document generator is configured to export the selected sub-document to an export document capable of being transmitted to a computing system associated with a user if it is determined that the selected copyright flag is resolved.

In accordance with further embodiment, a method of building aggregate documents is provided. The method includes generating an aggregate document. A sub-document is associated to the generated aggregate document. At least one license term that applies to the associated sub-document is then discovered. Thereafter, at least one copyright flag for the at least one discovered license term is generated in association with the sub-document.

In accordance with still another embodiment, a system to build aggregate documents is provided. The system includes an aggregate document generator, sub-document adder, sub-document license discoverer, and sub-document license flag generator. The aggregate document generator is configured to generate an aggregate document. The sub-document adder is configured to associate a sub-document to the generated aggregate document. The sub-document license discoverer is configured to discover at least one license term that applies to the associated sub-document. The sub-document license flag generator is configured to generate at least one copyright flag for the at least one discovered license term in association with the sub-document.

In accordance with an embodiment, a method of assessing license compliance of an aggregate document that includes at least one associated sub-document is provided. The method includes selecting a copyright flag associated with a sub-document of the at least one sub-document. The copyright flag is associated with licensing information for the sub-document. A determination is made as to whether the copyright flag is resolved. The selected sub-document is selectively exported to an export document for transmission to a computing system based on determination that the copyright flag is resolved.

In accordance with an embodiment, a system of assessing license compliance of an aggregate document that includes at least one associated sub-document is provided. The system includes a license compliance engine. The license compliance engine is configured to select a copyright flag associated with a sub-document of the at least one sub-document. The copyright flag is associated with licensing information for the sub-document. The license compliance engine is also configured to determine whether the copyright flag is resolved such that the sub-document can be selectively exported to an export document for transmission to a computing system based on determination that the copyright flag is resolved.

These and other purposes, goals and advantages of the present application will become apparent from the following detailed description of example embodiments read in connection with the accompanying drawings.

BRIEF DESCRIPTION OF THE DRAWINGS

Some embodiments are illustrated by way of example and not limitation in the figures of the accompanying drawings in which.

DETAILED DESCRIPTION

A system and method of managing licenses for aggregate documents are disclosed herein. In the following description, for the purposes of explanation, numerous specific details are set forth in order to provide a thorough understanding of example embodiments. It will be evident, however, to one skilled in the art, that an example embodiment may be practiced without all of the disclosed specific details.

As used herein a "copyright flag" or "flag" refers to a representation of a right or term associated with the use or license of a sub-document included in an aggregate document.

As used herein an "author" refers to a creator of the sub-document, or a right holder of the copyright for the sub-document, or a representative (agent) of the creator or right holder.

As used herein the creator or right holder of the sub-document is a person or entity.

Figure 1:
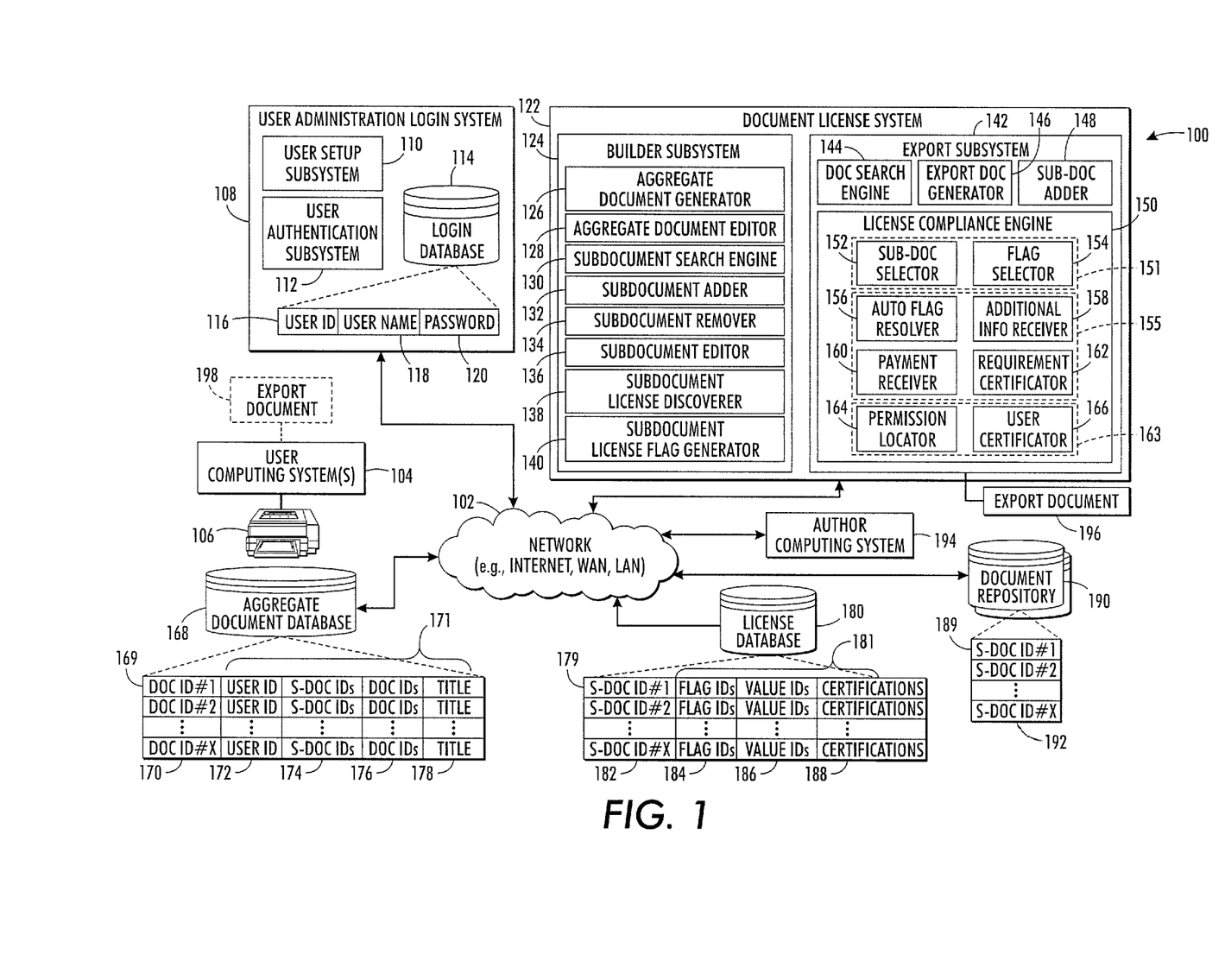
FIG. 1 illustrates an example document management system that includes a document license system.

FIG. 1 illustrates an example document management system 100 that includes a document license system 122. The document management system 100 includes a user administration/login system 108 and document license system 122 interconnected to a user computing system(s) 104 via a network 102. The network 102 can be a wide area network, local area network, or any combination of one or more networks configured to interconnect the systems, databases and other components of FIG. 1. One or more of the networks can be wired or wireless.

The user computing system(s) 104 is configured to login into the document management system 100 over the network 102 to generate and/or access one or more aggregate documents. The user computing system 104 is further configured to export an aggregate document from the document license system 122 in a printable format for printing, e.g., a printable format such as PDF. As an example, the user computing system 104 can print the aggregate document via printer 106. The printer 106 can be attached directly or via a network (e.g., LAN) to the user computing system 104. The user computing system 104 can be operated by a user (e.g., human operator or an aggregator/publisher program) to access, generate and/or export aggregate documents via the document license system 122 of the document management system 100.

The user administration/login system 108 is configured to administer users in the document management system 100 and to enable users to login into the document management system 100 over the network 102 via user computing system(s) 104. The user administration/login system 108 includes a user setup subsystem 110, user authentication (login) subsystem 112, and user login database 114.

The user setup subsystem 110 is configured to setup credentials for the user's access to the document management system 100, such as via a username and password combination. A user ID for the username-password combination can be assigned to the user for identification purposes within the document license system 122. Other credential mechanisms for authentication of the user can be used in addition or alternatively to the username and password combination. A system administrator or the user can setup a user's credentials for access to the document license system 122.

The authentication (login) subsystem 112 is configured to login the user into the document management system 100, such as by authenticating the user via username and password. The username/password combinations and associated user IDs for users that are authorized to use the document management system 100 can be maintained in the user login database 114 as will be described hereinbelow.

Upon user login, the user authentication subsystem 112 can authenticate a user's username and password received from the user computing system 104 against the username-password combinations in the user login database 114. After the user is authenticated, the user via user computing system 104 can access the document license system 122 via the user's user ID associated with the user's username/password combination. Additional or alternative authentication methods and system components can be used to login the user to the document management system 100.

The user login database 114 maintains the username/password combinations 118, 120 associated with associated user IDs 116 for users that have been authorized to the document management system 100 and given access to access the document license system 122. Additional or alternative authentication information can be maintained by the user login database 114 for login to the document management system 100 and access the document license system 122.

The document license system 122 is configured to enable a user (e.g., human operator or electronic aggregator/publisher program) to generate an aggregate document having multiple sub-documents and to manage copyright license information for the aggregate document. The document license system 122 can expose or provide multiple application program interfaces (APIs) that can be invoked by the electronic aggregator/publisher programs via computing system(s) 104 to access, generate and/or export aggregate documents via the document license system 122. The document license system 122 includes a builder subsystem 124, export subsystem 142, and can include databases 168, 180, 190.

In various embodiments, the databases 168, 180, 190 can also be distributed and maintained by one or more other systems. In these cases, the computing system 104 (e.g., at or after login) can provide locations or other information concerning the databases 168, 180, 190 to the document license system 122, such that the document license system 122 can access, generate and export aggregate documents as described herein. In other embodiments, the locations or other information concerning the databases 168, 180, 190 can be known or be available for access to the document license system 122.

The builder subsystem 124 of the document license system 122 is configured to enable a user to manage one or more aggregate documents. The builder subsystem 124 includes an aggregate document generator 126, aggregate document editor 128, sub-document search engine 130, sub-document adder 132, sub-document remover 134, sub-document editor 136, sub-document copyright license discoverer 138 and sub-document license flag generator 140.

The aggregate document generator 126 is configured to enable a user to generate an aggregate document in the document license system 122. More specifically, the aggregate document generator 126 can generate an aggregate document in the aggregate document database 168. In one embodiment or aspect, a record 169 that is associated with (representing) the aggregate document via a unique document ID is generated in the aggregate document database 168 by the aggregate document generator 126, as will be described in greater detail below with reference to the aggregate document database 168.

The aggregate document editor 128 is configured to enable the user to edit an aggregate document in the aggregate document database 168. For example, the aggregate document editor 128 can edit the connection (order) of sub-documents 174 that are part of the aggregate document's record 169. Additionally, the aggregate document editor 128 can also enable the user to provide/edit a title 178 and/or any other information that the user would like to be stored in the aggregate document's record 169.

The sub-document search engine 130 is configured to enable a user to conduct a search for sub-documents in the document repository 190 and to retrieve one or more sub-documents 189 for addition to the aggregate document in the aggregate document database 168, e.g., the aggregate document's record 169. The sub-document search engine 130 is configured to present one or more graphical user interfaces (not shown) to receive user search criteria and to display the retrieved sub-documents for user selection. A user can search for documents by sub-document ID 192, text in the sub-document, name of sub-document, or any other mechanism to retrieve a desired sub-document maintained in the document database 144. The sub-document's ID 192 can be added to the aggregate document's record 169.

The sub-document adder 132 is configured to add or associate at least one sub-document selected by the user to an aggregate document in the aggregate document database 168, e.g., the aggregate document's record 169. In one embodiment or aspect, the user can select at least one sub-document 189 from the graphical user interface presented by the sub-document search engine 130. In another embodiment or aspect, the user can select at least one sub-document 189 by its sub-document ID 192 via another graphical user interface (not shown). Upon selection of the at least one sub-document 189, its sub-document ID 192 is added to the aggregate document's record 169 in the aggregate document database 168. More specifically, the sub-document ID 192 is associated aggregate document ID 170 in the aggregate document database 168.

The sub-document remover 134 is configured to remove at least one sub-document selected by the user from an aggregate document in the aggregate document database 168, e.g., the aggregate document's record 169. In one embodiment or aspect, the sub-document remover 134 can present a graphical user interface (e.g., FIG. 2) with one or more sub-documents 189 of the document repository 190 that are associated with the aggregate document, e.g., aggregate document's record 169. The user can then select one or more of the sub-documents to be removed from the aggregate document. In another embodiment or aspect, the user can select at least one sub-document 189 by its sub-document ID 192 via another graphical user interface (not shown). Upon selection of the at least one sub-document 189, its sub-document ID 192 is removed from the aggregate document's record 169 in the aggregate document database 168.

The sub-document editor 136 is configured to enable the user to edit a sub-document document in the document repository 190. For example, the sub-document editor 138 can edit sub-document 189. In an embodiment, a copy of the sub-document having a new sub-document ID 192 can be created and saved in the document repository 190. Edits are then made to the new sub-document. In this case, the new sub-document ID is added to the license database 180 and original sub-document's flags 184, values 186 and/or certifications 188 are updated to indicate a derivative version of the original sub-document. The original sub-document's ID in the aggregate document database 168 is updated to the new sub-document ID in the sub-document listing 174.

The sub-document copyright license discoverer 138 is configured to discover or determine license information associated with a sub-document 189 that is added to the aggregate document, e.g., aggregate document's record 169. For example, the sub-document copyright license discoverer 138 can scan the sub-document for copyright, license or use information associated with the sub-document. For example, in the case of a web page as the sub-document, the sub-document license discoverer 138 can search the sub-document for the term "copyright" or terms such as "All rights reserved" that indicate the copyright, license or use of sub-document (e.g., the author's intent with regard to sharing the sub-document). The sub-document license discoverer 138 can also search for embedded HTML describing the location of a Creative Commons license, which can be retrieved in order to determine the specific terms of the copyright, license or use of the sub-document. If no license or use information is discovered, a default of "standard copyright" can be used. In alternative embodiment or aspects, another default copyright can be used.

The sub-document license flag generator 140 is configured to generate one or more license flags from the determined copyright, license or use information associated with the sub-document added to the aggregate document. For example, if the terms require attribution of the original author, an "attribution" flag could be set. In a case where the author requires specific text in the attribution that text could also be associated with the attribution flag. In another example, for an author requiring payment for non-academic uses of a work, a flag "free academic" could be set and a flag "nonacademic payment" specifying a price could also be set.

The export subsystem 142 of the document license system 122 is configured to enable a user to export an aggregate document in accordance with license or use information associated with constituent sub-documents of the aggregate document. The export subsystem 142 includes an aggregate document search engine 144, export document generator 146, sub-document adder 148 and license compliance engine 150.

The aggregate document search engine 144 is configured to enable a user to conduct a search for aggregate documents in the aggregate document database 168 and to retrieve an aggregate document (e.g., the aggregate document's record 169) for export to the user computing system 104 and/or printing via associated printer 106. The aggregate document search engine 144 can present one or more graphical user interfaces (not shown) to receive user search criteria and to display the retrieved aggregate documents for user selection. The aggregate document search engine 144 can further receive a selection of an aggregate document to export. A user can search for aggregate documents by aggregate document ID 170, user ID 172, sub-document(s) associated with the aggregate document 174, other aggregate documents 176 of which a particular aggregate document 169 is a constituent document, text in the aggregate document 169 (e.g., title 178), or any other mechanism to retrieve a desired aggregate document maintained in the aggregate document database 168.

The export document generator 146 is configured to enable a user to generate an export document 196 from a selected aggregate document (e.g., aggregate document 169) in accordance with licensing/use information associated with constituent documents of the aggregate document, (e.g., sub-document 189). The export document 196 can be transmitted or distributed from the export subsystem 142 of the document license system 122 to the computing system 104 (export document 196 is shown in dotted lines as export document 198 received by user computing system 104) for viewing and/or printing via printer 106. The export document generator 146 invokes (executes) the license compliance engine 150 to determine one or more of the constituent documents of the selected aggregate document to be exported (added) to the export document 196.

The sub-document adder 148 is configured to add one or more sub-documents (e.g., content)—that comply with the licensing/use information determined by the license compliance engine 150—to the export document 196 generated by the export document generator 146.

The license compliance engine 150 of the export subsystem 142 is configured to determine whether the sub-documents of an aggregate document selected for export comply with associated licensing/use information, and further configured to resolve potential non-compliance of the sub-documents such that the sub-documents can be exported (added) to the export document 196. Resolution of potential non-compliance can include the addition of information required for the export of the sub-document to the export document (e.g., addition of attribution, license or watermark information to the export document). Resolution can also involve sending a notification of use of the sub-document to a certain electronic address for the author or owner of the sub-document. Further, resolution of potential non-compliance can include collection of additional information, payment or certification from the user. Moreover, resolution can involve obtaining the permission of the author associated with the sub-document to be exported. Additional or alternative compliance resolution as envisioned can be applied in the document license system 122.

The license compliance engine 150 includes an iterator 151, a non-standard copyright compliance module 155 and a standard copyright compliance module 163.

The iterator 151 is configured to iterate over sub-documents 174 associated with a selected aggregate document 170 (e.g., aggregate document 169) to be processed for license compliance from the aggregate document database 168. The iterator 151 is further configured to iterate over one or more flags 184 associated with each of the sub-documents 174 (e.g., associated with sub-document 169) in the license database 180. The iterator 151 includes a sub-document selector 152 and flag selector 154.

The sub-document selector 152 is configured to iteratively select a sub-document (e.g., from one or more sub-documents 174) associated with the aggregate document (e.g., aggregate document 169) to be processed for license compliance from the aggregate document database 168.

The flag selector 154 is configured for each of the sub-documents 174 associated with the aggregate document 169 selected by the sub-document selector 152 to iteratively access or select a flag (e.g., from one or more flags 184), as well as related flag values 186 and/or certificates 188 that are associated with the selected sub-document (e.g., sub-document 179) from the license database 180. The flag selector 154 can determine whether the accessed or selected flag should be processed by the non-standard copyright compliance module 155 or the standard copyright compliance module 163. It is noted that if any one of the flags is not satisfied, the selected sub-document (as well as any additional information that is associated with any matched flags)

will not added to the export document by the license compliance engine 150 and the iteration of the flags for the selected sub-document 174 is terminated.

The non-standard copyright compliance module 155 is configured to determine whether a selected flag (e.g., flag 184) represents a non-standard copyright use associated with the selected sub-document 182 (e.g., sub-document 169) in the license database 180 and to perform one or more operations to resolve the selected flag. In certain instances as described below resolution is possible while in other instances the flag will not be resolved. The non-standard copyright compliance module 155 includes an automatic flag resolver 156, additional information receiver 158, payment receiver 160 and requirement certificator 162.

The automatic flag resolver 156 is configured to determine whether automatic resolution of the selected flag 184 is possible, and further configured to perform an action(s) that fulfill the selected flag if automatic resolution is possible. For example, the selected flag can indicate that information, such as attribution, license, watermark, or other information, is to be added to the export document 196.

The automatic flag resolver 156 can determine whether the indicated information is available in flag value 186 related to the selected flag 184. If so, the license compliance engine 150 can add this information to the export document 196 to automatically resolve the selected flag 184, once the other flags associated with the selected sub-document 174 have been successfully processed.

In alternate embodiments, the automatic flag resolver 156 can send notification of use to a specified electronic address, e.g., for the author or owner of the sub-document 174. Similarly, this notification can be sent once the other flags associated with the selected sub-document 174 have been successfully processed.

The additional information receiver 158 is configured to determine whether additional information from the user is required for the selected flag 184, prompt for (e.g., via user computing device 104) and determine whether such additional information has in fact been received from the user. For example, the selected flag 184 can require a version of the work or whether the work is derivative work. The automatic flag resolver 156 can prompt the user via user computing device 104 for the required additional information (e.g., version).

If the user provides the additional information (e.g., version), the license compliance engine 150 can in some embodiments add this information to the export document 196 or in other embodiments can store this information as value 186 in association with flag 182 for the selected sub-document 174, once the other flags associated with the selected sub-document have been successfully processed. In some embodiments, the additional information receiver 158 can initially perform a check of value 186 that is associated with the flag 184 for a previously stored version and prompt the user to confirm this version.

The payment receiver 160 is configured to determine whether payment is required to export/use the sub-document 174, to prompt the user for payment (e.g., dollar amount in accordance with value 186) associated with the selected flag 184, and further to determine whether such required payment has been in fact received from the user, such as via user computing system 104. For example, the selected flag 184 can require payment of a certain dollar amount in value 186 for exporting the sub-document 174. Such payment can be for the sub-document or for each page of the sub-document if there are multiple pages in the sub-document 174.

The requirement certificator 162 is configured to determine whether a requirement certification is required to export/use the sub-document 174, to prompt the user for the requirement certification (e.g., in a cases where the author has given nonelectronic written permission to use a document, the user could certify that permission has been granted) associated with the selected flag 184, and further to determine whether requirement certification has been in fact received from the user, such as via user computing system 104. For example, the selected flag 184 can indicate a requirement certification, such as permission from the author or non-academic use, to facilitate exporting of the sub-document 174 to the export document 196. The requirement certificator 162 can determine whether a requirement certification is required to export/use the sub-document 174, prompt the user for the requirement certification (e.g., the document will only be used for academic purposes) associated with the selected flag 184, and further determine whether requirement certification has been in fact received from the user, such as via user computing system 104. For example, the selected flag 184 can indicate a requirement certification, such as the document will only be used for academic purposes, to facilitate exporting of the sub-document 174 to the export document 196. The requirement certification can be stored in the certifications 188 associated with the flag 184 in the license database 180.

The standard copyright compliance module 163 is configured to determine whether a selected flag (e.g., flag 184) represents standard copyright use associated with the selected sub-document 182 (e.g., sub-document 169) in the license database 180 and to perform one or more operation to resolve the selected flag. In certain instances as described below resolution is possible while in other instances the flag will not be resolved. The standard copyright compliance module 163 includes a permission locator 164 and user certificator 166.

The author permission locator 164 is configured to determine whether author (or owner) permission that is required to export/use the sub-document 174 is recorded for the sub-document 174. In embodiments in which author permission is recorded, such as in value 186 for the flag 184 in the license database 180, the author permission locator 164 is configured to provide an indication that the selected sub-document complies with the required license to be added to the aggregate document 196.

In embodiments in which author permission is not recorded in the license database 180 (e.g., such as in value 186 for flag 184), the author permission locator 164 is further configured to request author (or owner) permission (e.g., via electronic mail from author computing system 194), and to determine whether the requested permission has been received from the author. Such request for author permission can be automatic if the electronic address is recorded or available. In some embodiments, the electronic address for the automatic request can be stored in the license database 180 (e.g., in value 186 for the flag 184). In other embodiments, the author permission locator 164 is configured to request the electronic address for the author (or owner) from the user using one or more graphical user interfaces presented via the user computing system 104, and further configured to determine whether such electronic address has in fact been received from the user.

The user certificator 166 is configured to determine whether user certification of author permission is required to export/use the sub-document 174, to prompt the user for the user certification (e.g., request that a scanned copy of the author's written permission be provided or that the user provide an affidavit of having received such permission) associated with the selected flag 184, and further to determine whether user certification has been in fact received from the user, such as via user computing system 104. For example, the selected flag 184 can require user certification of author permission through a graphical user interface via user computing device 104 to facilitate exporting of the sub-document 174 to the export document 196. The user certificator 166 is further configured to determine whether user certification is received.

After the iterator 151 iterates through the flags 184 (and associated values 186) for the selected sub-document 174 that is determined to be in copyright compliance via the non-standard copyright module 155 or the standard copyright module 163, the license compliance engine 142 can then instruct the sub-document adder 148 to add the selected sub-document 174 to the export document 196.

The aggregate document database 168 is configured to maintain one or more aggregate documents (e.g., records representing the aggregate documents), such as an example aggregate document 169. The aggregate documents can be identified by document IDs 170. The aggregate document database 168 further maintains associations 171 (e.g., associations 172-178) related to aggregate documents (document IDs 170) such as the example aggregate document 169. The associations 171 for the example aggregate document 169 can be maintained in one or more tables of the aggregate document database 168 and can include user ID 172 (or the owner) associated with the aggregate document 169 as provided by the user administration login system 108, a listing of one or more sub-documents 174 associated with the example aggregate document 169, a listing of one or more other aggregate documents 176 of which the example aggregate document 169 is considered to be a sub-document, and a title 178 associated with the example aggregate document 169.

The license database 180 is configured to maintain one or more sub-documents (e.g., records representing the sub-documents) that are constituents of the aggregate documents in the aggregate document database 168, such as an example sub-document 179 that can be a constituent of the aggregate document 169, as listed in the sub-document listing 174 for the aggregate document 169. The sub-document database 180 further maintains associations 181 (e.g., associations 182-188) related to sub-documents (sub-document IDs 182), such as the example sub-document 179. For example, the associations 181 for the example sub-document 179 can be maintained in one or more tables of the sub-document database 180 and can include a listing of one or more flags (e.g., flag IDs) 184 associated with the example copyright license/use term for the sub-document 179, one or more values each associated with one of the flags, and at least one requirement certification 188 associated with one of the flags.

The document repository 190 is configured to maintain sub-documents represented or identified by their sub-document IDs 192. The document repository can maintain actual sub-document content files, e.g., sub-document content file 189 that is identified by sub-document IDS 192.

The author computing system 194 is associated with an author (or owner) of at least one sub-document maintained in the document repository 190, such as sub-document 189. The author computing system 194 is configured to receive one or more requests (e.g., via electronic email) from the document license system 122 for the author's permission for export/use of the author's sub-document. The author computing system 194 is further configured to respond to such requests via one or more responses (e.g., via electronic email), automatically or to enable the author (or owner) to respond manually. The responses can be transmitted by the author computing system 194 to the document license system 122. In one embodiment, an email client device (not shown) can be associated with (or incorporated in) the author computing system 194 and configured to receive and transmit electronic mail concerning author permission for export/use of the author's one or more sub-documents.

In view of the foregoing, the document license system 122 enables the user via user computing system 104 to generate an aggregate document having multiple sub-documents and to export that or another aggregate document to an export document 196 in accordance with copyright license/use information associated with the sub-documents of the aggregate document. The export document 196 can be transmitted from the document license system 122 to the user computing system 104, as indicated by export document 198, for viewing and printing, such as via printer 106. In one embodiment, transmission can be accomplished via email. Alternate transmission mechanisms can be used, such as direct download to the user computing system 104 via file transfer protocol (FTP) or storage in a centralized file repository (not shown) that the user can access (e.g., via FTP) and communicated to the user via an email. The document can be in one of many formats, such as PDF, TIFF, JPG or another format.

Figure 2:
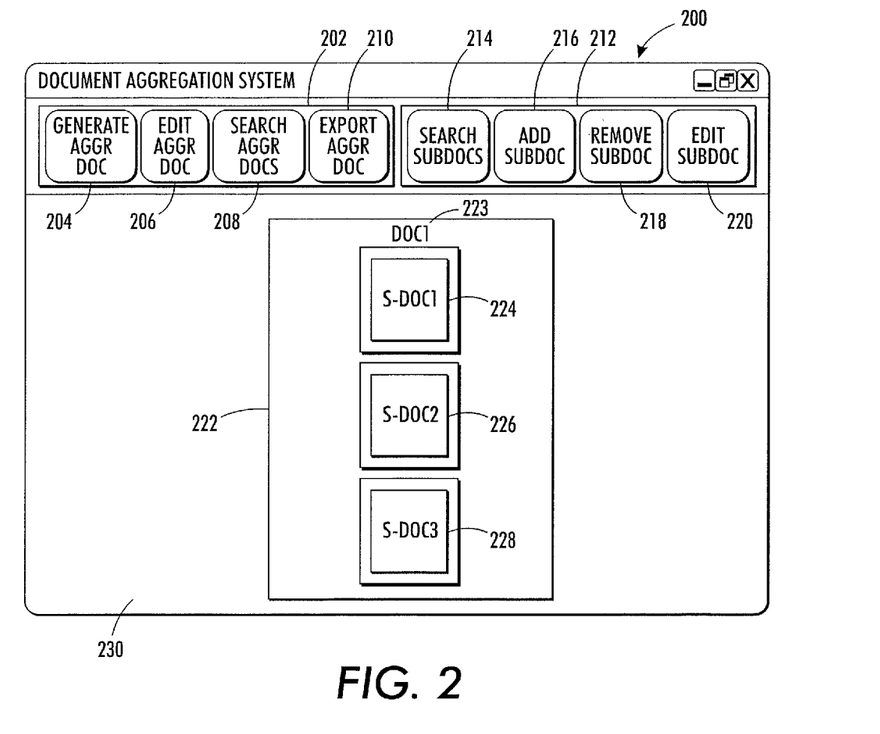
FIG. 2 illustrates an example graphical user interface for an generate aggregate document in the document license system of FIG. 1.

FIG. 2 illustrates an example graphical user interface 200 for generating and exporting an aggregate document via the document license system 122 of FIG. 1. The example graphical user interface 200 includes an aggregate document toolbar 202, sub-document toolbar 212 and interface region 230.

The aggregate document toolbar 202 includes an aggregate document generation tool 204, aggregate document editing tool 206, aggregate document search tool 208 and aggregate document export tool 210, which are described in greater detail below. The tools 204-210 can be invoked by the user via the user computing system 104, e.g., clicking on a tool via a mouse or selecting/activating the tool via a keyboard.

The aggregate document generation tool 204 is configured to generate an aggregate document 222 that can be displayed and configured in the interface region 230. The aggregate document generation tool 204 can invoke or execute the aggregate document generator 126 of the builder system 124 in the document license system 122 to generate a new aggregate document 222, e.g., aggregate document 169 in the aggregate document database 168 as illustrated in FIG. 1. In generating the new aggregate document 222, the aggregate document generator 126 creates a record for the aggregate document 222—identified by doc ID 170 and associated with associations 171 (e.g., associations 172-178)—in the aggregate document database 168.

The aggregate document editor tool 206 is configured to enable editing of the aggregate document, such as the addition/deletion of sub-documents 224, 226, 228 and their relationships, creating/editing a title 223 for the aggregate document 222, as well as editing of textual or graphical information in the document aggregate document 222. The aggregate document editor tool 206 can invoke or execute the aggregate document editor 128 of the builder system 124 in the document license system 122. It is noted that the sub-documents 224-228 are maintained in the document repository 190. Addition or deletion of sub-documents can involve adding/deleting references to the sub-documents of the document repository (e.g., uniform resource locator for web page(s), file names/paths for files or other identification for the sub-documents 224-228). In one embodiment, simple relationships between constituent sub-documents can be indicated by their ordering in the sub-document listing 174 of the aggregate document database 168. In addition, other more sophisticated relationships can be provided, such as how the sub-documents are to be displayed or integrated in relation to each other within the aggregate document 222. Such relationships can be maintained as metadata (not shown) in the aggregate document database 168. The title of the aggregate document 223 can be provided by the user and further can be stored as title 178 in the aggregate document database 168.

The aggregate document search tool 208 is configured to conduct a search for aggregate documents and to retrieve an aggregate document (e.g., aggregate document 222) for editing and or exporting in the interface 230. The aggregate document search tool 208 can invoke or execute the aggregate document search engine 144 of the export subsystem 142 in the document license system 122. For example, a user can conduct a search for aggregate documents in the aggregate document database 168 and to retrieve an aggregate document 222 for export to the user computing system 104 and/or printing via associated printer 106. One or more graphical user interfaces can be presented to receive user search criteria (e.g., doc ID 170, user ID 172, sub-doc ID 174, aggregate doc ID 176, title 178 and/or other criteria) and to display the retrieved aggregate documents for user selection. Upon user selection of an aggregate document (e.g., aggregate document 222) from the retrieved aggregate documents, the selected aggregate document is loaded into the interface region 230 in accordance with associations 171 as well as any available relationship metadata for the constituent sub-documents (e.g., sub-documents 224-228).

The aggregate document export tool 210 is configured to export the aggregate document 222 to an export document that can be transmitted to the user computing system 104 in accordance with licensing/use information associated with constituent sub-documents 224-228 of the aggregate document 222. The aggregate document export tool 210 can invoke or execute the export document generator 146 of the export subsystem 142 in the document license system 122 of FIG. 1. For example, an export document 196 of FIG. 1 can be generated from the aggregate document 222 of FIG. 2 and can be transmitted or distributed to the computing system 104. The export document 196 can be transmitted to the user computing system 104—shown export document 198—for viewing and/or printing via printer 106.

The sub-document toolbar 212 includes a sub-document search tool 214, sub-document addition tool 216, sub-document removal tool 218 and sub-document editing tool 220. The various tools 214-220 can be invoked by the user via the user computing system 104, e.g., clicking on a tool via a mouse or selecting/activating the tool via a keyboard.

The sub-document search tool 214 is configured to conduct a search for sub-documents and to retrieve one or more sub-documents 224-228 for addition to the aggregate document 222 in the in the interface 230. The sub-document search tool 214 can invoke or execute the sub-document search engine 130 of the builder subsystem 124 in the document license system 122. For example, a user can conduct a search for sub-documents in the document repository 190 and to retrieve one or more sub-documents 189 for addition to the aggregate document in the aggregate document database 168, e.g., the aggregate document's record 222. One or more graphical user interfaces can be presented to receive user search criteria and to display the retrieved sub-documents for user selection. A user can search for sub-documents by sub-document ID 192, text in the sub-document, name of sub-document, or any other mechanism to retrieve one or more desired sub-documents maintained in the document database 144.

The sub-document addition tool 216 is configured to add at least one sub-document selected by the user to the example aggregate document 222 in the aggregate document database 168. More specifically, the sub-document's ID 192 can be added to the aggregate document's record (e.g., added to sub-document ID 174) in the aggregate document database 168. The user can thereafter configure via interface 230 the relationship of the added sub-document to the sub-documents that already part of the example aggregate document 222.

The sub-document addition tool 216 can invoke or execute the sub-document search added 132, and can further invoke or execute the sub-document license discoverer 138 and sub-document license flag generator 140 of the builder subsystem 124 in the document license system 122. Upon selection of one or more the sub-documents 224-228 to be added to the aggregate document 222, a search of the license database 180 can be performed to determine whether records associated with the one or more of the documents 224-228 exist. If not, the sub-document license discoverer 138 can be invoked or executed to discover license information associated with sub-documents 224-228, such as by scanning the documents 192 of the document repository 190. If no license or use information is discovered, a default of "standard copyright" can be used. The sub-document license flag generator 140 can be invoked or executed to then generate one or more license terms (flags) and any associated values of the flags from the copyright, license or use information associated with the sub-documents. This associated license information is stored in connection with the sub-documents in the license database 180.

The sub-document removal tool 218 is configured to remove at least one selected sub-document from an aggregate document 222. The sub-document removal tool 214 can invoke or execute the sub-document remover 134 of the builder subsystem 124 in the document license system 122. For example, a user can remove at least one sub-document 224, 226 or 228 from an aggregate document 222. Removal of a sub-document entails removal of the sub-document's ID 182 from the listing of the sub-documents 174 in the aggregate document database 168.

The sub-document editing tool 220 is configured to edit a sub-document document in the document repository 190. The sub-document editing tool 220 can invoke or execute the sub-document editor 136 of the builder subsystem 124 in the document license system 122. A user can edit a sub-document document in the document repository 190. For example, the sub-document editor 138 can edit sub-document 189. In one embodiment, the sub-document editor 138 can determine whether the sub-document can be edited by determining whether there is a flag in the license database 180 for the sub-document that allows derivative works to be created. If so, upon editing, the sub-document editor 136 can copy the sub-document to be edited into a new sub-document having a sub-document ID 192 in the document repository 190. Edits can then be made to the newly created sub-document. The new sub-document ID is added to the license database 180 and the original sub-document's flags 184, values 186 and/or certifications 188 are updated to indicate creation of a derivative version of the original sub-document. The original sub-document's ID in the aggregate document database 168 is updated to reflect the new sub-document ID in the sub-document listing 174.

Figure 3:
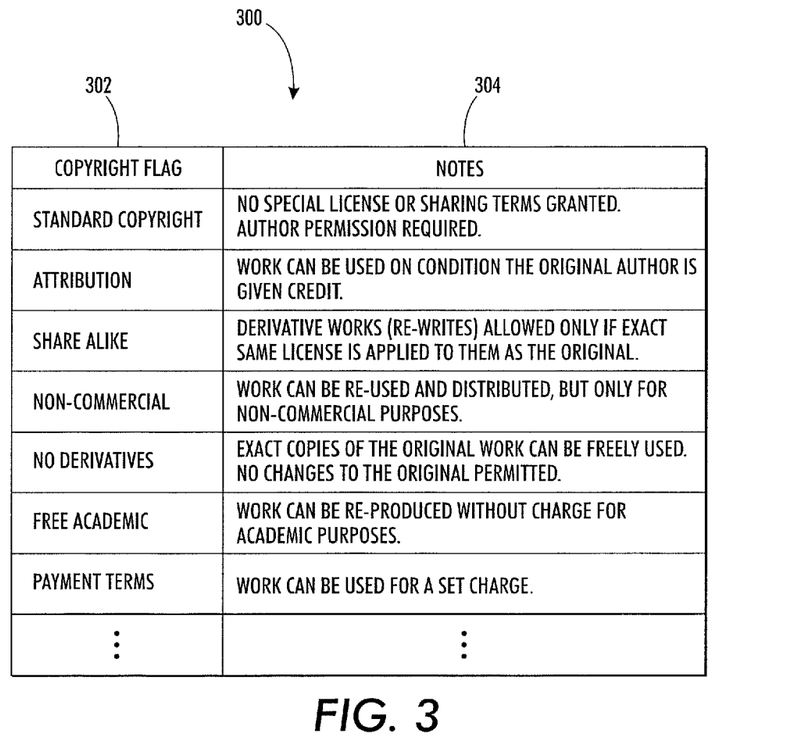
FIG. 3 illustrates an example listing of copyright flags that can be associated with sub-documents of the aggregate document in the document license system of FIG. 1.

FIG. 3 illustrates an example listing 300 of copyright flags 302 that can be associated with sub-documents of the aggregate document in the document license system of FIG. 1. Copyright flags can be text-based as shown in the example listing 300 or can be indicated by other representations associated with these flags, e.g., numbers letters, or other programmatic representations. With reference to the listing 300, an example "standard copyright" flag can be generated, which would require author permission to use the sub-document as part of the aggregate document. In this case, a value 186 that is associated with the flag may be set to one (1) to indicate that standard copyright applies. In other cases, the standard copyright flag can be set to zero (0), indicating that standard copyright does not apply. An "attribution" flag can be used to allow a derivative work if an exact license is applied as with respect to the original. In such a case, the value for the attribution flag can include the text of the attribution. Other flags may have no values, such as the "share alike", "non-commercial", "no derivatives", "free academic" and other such flags. A "payment terms" flag can be associated with a value of the payment for use of the sub-document. The terms can indicate a price and whether the price is per document or per page of the document (if there are multiple pages). Other copyright flags can be used in addition to or instead of the flags shown in FIG. 3.

Figure 4:
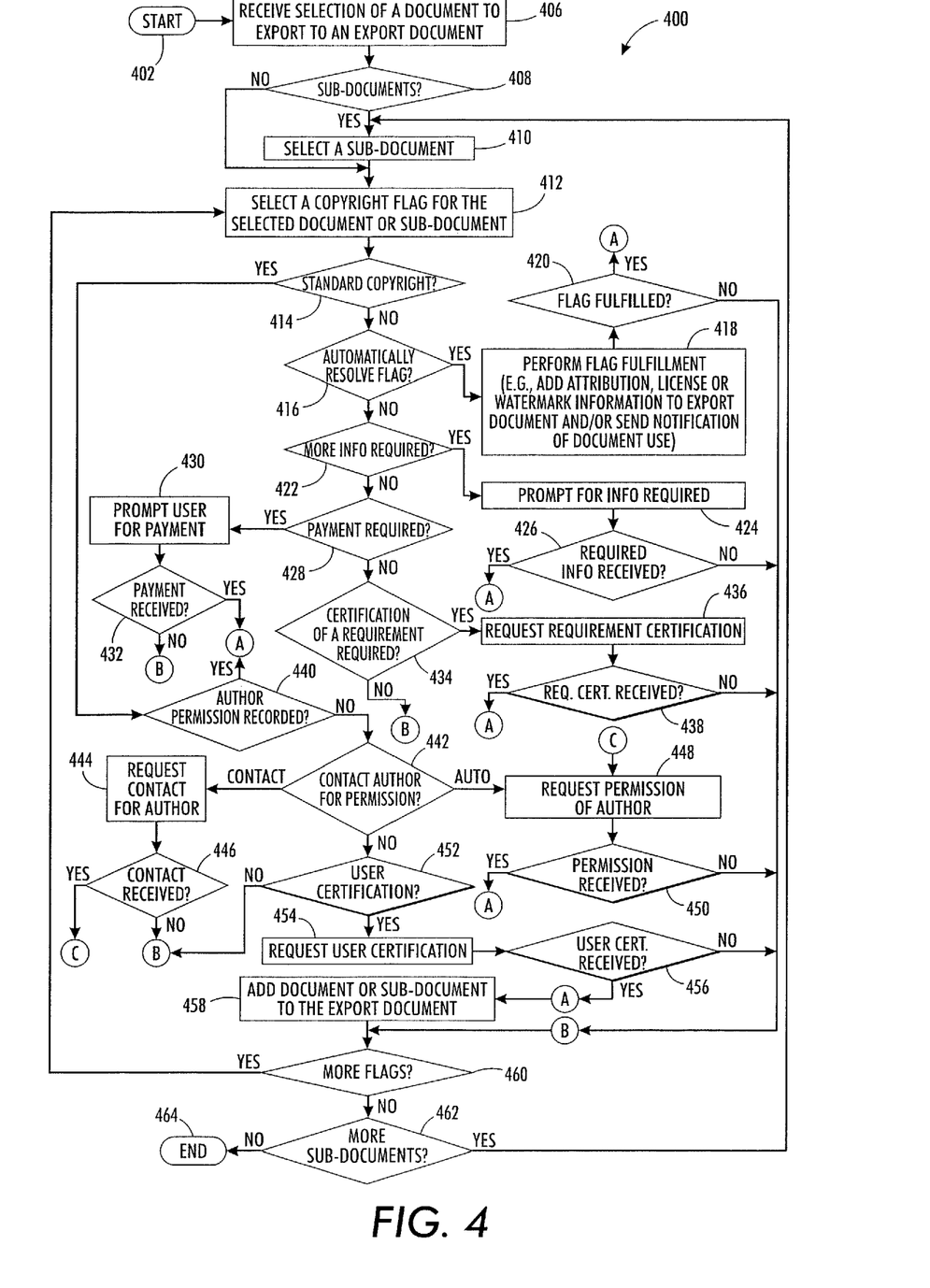
FIG. 4 illustrates a flowchart of an example method of exporting an aggregate document in the document license system of FIG. 1.

FIG. 4 illustrates a flowchart of an example method 400 of exporting an aggregate document in the document license system of FIG. 1. The example method 200 starts at operation 402. At operation 406, a selection of an aggregate document to export is received. For example, the user can select the aggregate document export tool 210 to export example document 222, as illustrated in FIG. 2. An export document is generated by the export subsystem 142, such as export document 196 in FIG. 1. At operation 408, a determination is made as to whether the selected aggregate document 222 includes sub-documents. For example, the sub-document selector 152 can determine that the aggregate document 222 include sub-documents 224-228 by accessing the sub-documents listing 174 associated with the example aggregate document 222 in the aggregate document database 168.

If it is determined that are sub-documents, the method continues at operation 410 where a first sub-document is selected. For example, the selection can be performed by the sub-document selector 152 of the iterator 151 in the export subsystem 142 of FIG. 1. Alternatively, the selected aggregate document is the only one that is selected. In this case, the aggregate document does not contain any sub-documents. Thereafter, the method 400 continues at operation 412.

At operation 412, a copyright flag is selected for the (selected sub-document or aggregate document). Flag selection can be performed by the flag selector 154 of the iterator 151 in the export subsystem 142 of FIG. 1. A flag 184 can be selected for the aggregate document 182 from the license database 180.

At operation 414, a determination is made as to whether the flag indicates that "standard copyright" or "non-standard copyright" applies to the selected sub-document. For example, the flag selector 154 can determine whether the flag should be processed by the non-standard copyright compliance module 155 or the standard copyright compliance module 163. If it is determined that standard copyright does not apply, the method 400 continues at operation 416. Alternatively, if standard copyright does apply, the method continues at operation 440.

At operation 416, a determination is made as to whether the selected flag can be resolved automatically for the selected sub-document. If so, the method 400 continues at operation 418 to perform flag fulfillment, such as adding attribution, license or watermark information to the aggregate document and/or sending notification of document use to the author. If it is determined that the flag is fulfilled at 420, the method 400 continues at operation 458 to add the sub-document to the aggregate document, e.g., export document 196.

If it is determined that the flag is not fulfilled at 420, the selected sub-document is not added to the export document 196 in relation to the selected flag. Thereafter, the method continues at operation 460 to process additional flags, if any. Operations 416-420 can be performed by the automatic flag resolver 156 of the nonstandard copyright compliance module 155 in the export subsystem 142 illustrated in FIG. 1.

At operation 422, a determination is made as to whether more information is required from the user for the selected sub-document. If so, the method 400 continues at operation 424 to prompt the user for the required information. If it is determined that the required information was received at operation 426, the method 400 continues at operation 458 to add the sub-document to the aggregate document, e.g., aggregate document 196. If it is determined that the required information was not received at operation 426, the method 400 continues at operation 460 to process additional flags, if any. Operations 422-426 can be performed by the additional information receiver 158 of the non-standard copyright compliance module 155 in the export subsystem 142 illustrated in FIG. 1.

At operation 428, a determination is made as to whether payment is required from the user for the selected sub-document. If so, the method 400 continues at operation 430 to prompt the user for the payment. If it is determined that the required payment was received at operation 432, the method 400 continues at operation 458 to add the sub-document to the aggregate document, e.g., aggregate document 196. If it is determined that the required payment was not received at operation 432, the method 400 continues at operation 460 to process additional flags, if any. Operations 428-432 can be performed by the payment receiver 160 of the non-standard copyright compliance module 155 in the export subsystem 142 illustrated in FIG. 1.

At operation 434, a determination is made as to whether requirement certification is required from the user for the selected sub-document. If so, the method 400 continues at 436 to prompt the user for the requirement certification. If it is determined that the requirement certification was received at operation 438, the method 400 continues at operation 458 to add the sub-document to the aggregate document, e.g., aggregate document 196. If it is determined that the requirement certification was not received at operation 438, the method 400 continues at operation 460 to process additional flags, if any. Operations 434-438 can be performed by the requirement certificatory 162 of the non-standard copyright compliance module 155 in the export subsystem 142 illustrated in FIG. 1.

Now with reference to the determination at operation 414, if it is determined that standard copyright does apply, the method 400 continues at operation 440 where a determination is made as to whether author permission for the selected sub-document is recorded. If it is determined that the author permission is recorded at operation 440, the method 400 continues at operation 458 to add the sub-document to the aggregate document, e.g., aggregate document 196. It can be considered that the standard copyright flag, which is associated with recorded author permission, is automatically resolved. If it is determined that the author permission is not recorded at operation 440, the method 400 continues at operation 442, where a determination is made as to whether contact information for the author is recorded or is to be requested from the user.

At operation 444, the contact information for the author is requested from the user. If it is determined that the contact information was received at operation 446, the method 400 continues at operation 448 as will be described below. If it is determined that the contact information was not received at operation 446, the method 400 continues operation 460 to process additional flags, if any. At operation 448, author permission is requested using contact information that was recorded or received. If it is determined that the contact information was received at 450, the method 400 continues operation 458 to add the sub-document to the aggregate document, e.g., aggregate document 196. If it is determined that the contact information was not received at operation 450, the method 400 continues operation 460 to process additional flags, if any. It can be considered that the standard copyright flag, which is associated with recorded author contact information, is automatically resolved. Operations 440-450 can be performed by the permission locator 164 of the standard copyright compliance module 163 in the export subsystem 142 illustrated in FIG. 1.

At operation 454, a determination is made as to whether user certification—indicating that user has author's permission—is required for the selected sub-document. If so, the method 400 continues at 454 to prompt the user for the user certification. If it is determined that the user certification was received at operation 456, the method 400 continues at operation 458 to add the sub-document to the aggregate document, e.g., aggregate document 196. If it is determined that the user certification was not received at operation 456, the method 400 continues at operation 460 to process additional flags, if any. Operations 452-456 can be performed by the user certificatory 162 of the standard copyright compliance module 163 in the export subsystem 142 illustrated in FIG. 1.

At operation 458, the selected sub-document is added to the export document 196. If the selected sub-document was previously added to (or removed from) the export document 196 in relation to another selected flag, the same sub-document is not added to the export document 196 again.

At operation 460, if the selected sub-document was added previously to the export document 196 in relation to another selected flag, the selected sub-document is removed from the export document 196. Furthermore, a determination is made as to whether there are additional flags for the selected subdocument. If so, the method 400 continues at operation 412 and operations 412-460 are performed for the next flag. The flag iterator 154 can perform operation 460. If there are no additional flags for the selected document, the method 400 continues at operation 462.

The removal (or non-inclusion) of the selected sub-document with respect to the export document 196 in connection with the non-fulfillment of the selected copyright flag does not remove the selected sub-document from the aggregate document in the aggregate document database 168. In some embodiments, an indication that a conflict exists with respect to the selected flag can be added for the selected sub-document in the license database 180. Conflicts can sometimes be fixed at a later time, allowing the selected sub-document to be included in a future export document 196.

In some embodiments, a place holder for the removed (or non-included) selected sub-document can be generated in or added to the export document 196, indicating the removed (or non-included) selected sub-document and possibly even why it was removed. For example, when generating an export document 196 that is intended to be reviewed before final publication, the user might specify a banner page for each removed selected sub-document, including the title, author, original source (e.g., URL), as well as the reason(s) requiring its removal.

At operation 462, a determination is made as to whether there are additional sub-documents to be processed for the selected aggregate document, e.g., example aggregate document 222. If so, the method 400 continues at operation 410 and operations 410-462 are performed for the next selected sub-document. The sub-document selector 152 of the iterator 154 can perform operation 462.

Figure 5:
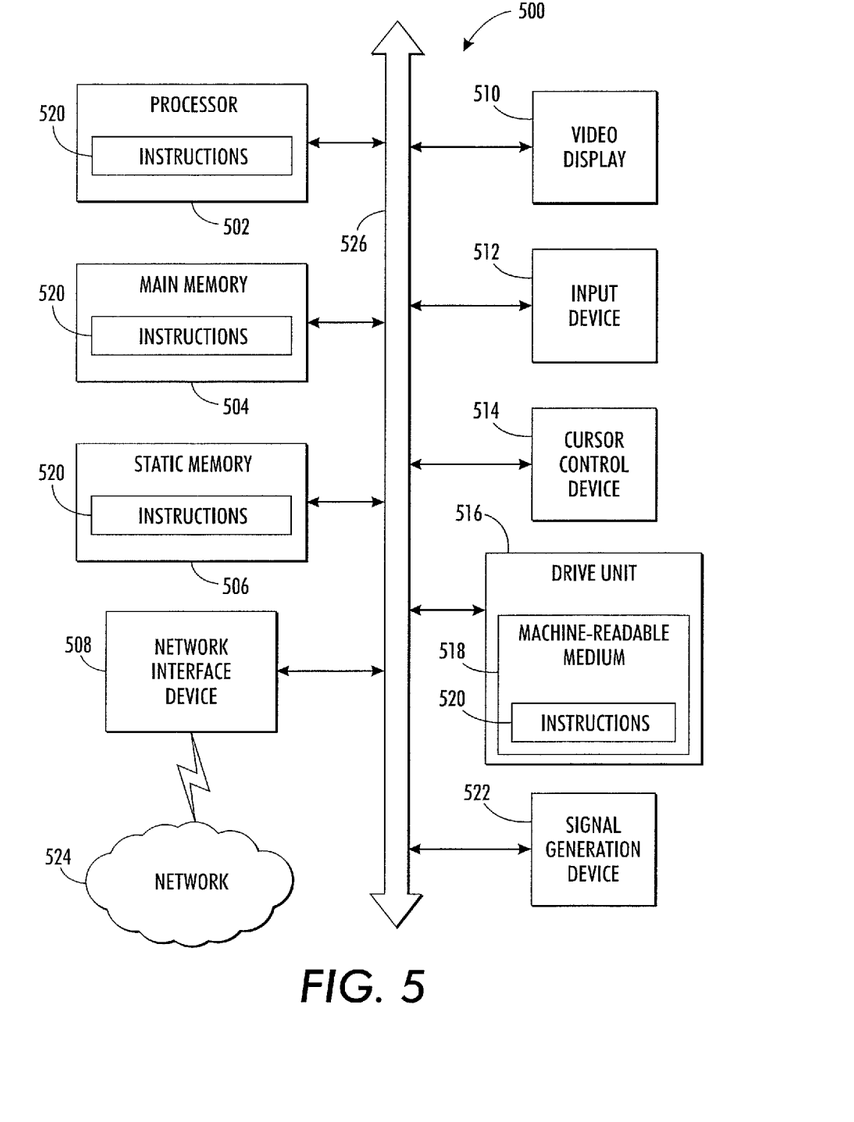
FIG. 5 is a block diagram of a general computer system that can perform any computer based functions or methods disclosed herein.

FIG. 5 is a block diagram of a general computer system 500. The computer system 500 may include a set of instructions that may be executed to cause the computer system 500 to perform any one or more of the computer based functions or methods disclosed herein. The computer system 500, or any portion thereof, may operate as a standalone device or may be connected, e.g., using a network, to other computer systems, databases and peripheral devices. The computer system 500 can, for example, be the user computing system 104, the user administration login system 108 and/or the document license system 122.

In a networked deployment, the computer system 500 may operate in the capacity of a document management system (or portion thereof) as illustrated in FIG. 1, for example. The computer system 500 may also be implemented as or incorporated into various devices, such as a personal computer (PC), a tablet PC, a personal digital assistant (PDA), a mobile device, a palmtop computer, a laptop computer, a desktop computer, a communications device, a control system, a scanner, a facsimile machine, a printer, a personal trusted device, a web appliance, or any other machine capable of executing a set of instructions (sequential or otherwise) that specify actions to be taken by that machine. Further, while a single computer system 500 is shown, the term "system" shall also be taken to include any collection of systems or sub-systems that individually or jointly execute a set, or multiple sets, of instructions to perform one or more computer functions as described herein.

As shown in FIG. 5, the computer system 500 may include a processor 502, e.g., a central processing unit (CPU), a graphics-processing unit (GPU), or both. Moreover, the computer system 500 may include a main memory 504 and a static memory 506 that may communicate with each other via a bus 526. As shown, the computer system 500 may further include a video display unit 5910, such as a liquid crystal display (LCD), an organic light emitting diode (OLED), a projection unit, a television, a flat panel display, a solid state display, or a cathode ray tube (CRT). Additionally, the computer system 500 may include an input device 512, such as a keyboard, and a cursor control device 514, such as a mouse. The computer system 500 may also include a disk drive unit 516, a signal generation device 522, such as a speaker or remote control, and a network interface device 508.

In a particular embodiment, as depicted in FIG. 5, the disk drive unit 516 may include a computer-readable medium 518 in which one or more sets of instructions 520, e.g., software, may be embedded. Further, the instructions 520 may embody one or more of the methods or logic as described herein. In a particular embodiment, the instructions 520 may reside completely, or at least partially, within the main memory 504, the static memory 506, and/or within the processor 502 during execution by the computer system 500. The main memory 504 and the processor 502 also may include computer-readable media.

In an alternative embodiment, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system encompasses software, firmware, and hardware implementations.

In accordance with various embodiments, the methods described herein may be implemented by software programs tangibly embodied in a processor-readable medium and may be executed by a processor. Further, in an exemplary, non-limited embodiment, implementations may include distributed processing, component/object distributed processing, and parallel processing. Alternatively, virtual computer system processing may be constructed to implement one or more of the methods or functionality as described herein.

The present application contemplates a computer-readable medium that includes instructions 520 or receives and executes instructions 520 responsive to a propagated signal, so that a device connected to a network 524 may communicate voice, video or data over the network 524. Further, the instructions 520 may be transmitted or received over the network 524 via the network interface device 508.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium may include a solid-state memory such as a memory card or other package that houses one or more non-volatile read-only memories. Further, the computer-readable medium may be a random access memory or other volatile re-writable memory. Additionally, the computer-readable medium may include a magneto-optical or optical medium, such as a disk or tapes or other storage device to capture signals such as those communicated over a transmission medium. A digital file attachment to an e-mail or other self-contained information archive or set of archives may be considered a medium that is equivalent to a tangible storage medium. Accordingly, the application is considered to include any one or more of a computer-readable medium and other equivalents and successor media, in which data or instructions may be stored.

Although the present application describes components and functions that may be implemented in particular embodiments with reference to particular standards and protocols, the application is not limited to such standards and protocols. Such standards and protocols are periodically superseded by faster or more efficient equivalents having essentially the same functions. Accordingly, replacement standards and protocols having the same or similar functions as those disclosed herein are considered equivalents thereof.

Thus, a system and method of managing licenses for aggregate documents have been described. Although specific example embodiments have been described, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments shown are described in sufficient detail to enable those skilled in the art to practice the teachings disclosed herein. Other embodiments may be utilized and derived therefrom, such that structural and logical substitutions and changes may be made without departing from the scope of this application. This Detailed Description, therefore, is not to be taken in a limiting sense, and the scope of various embodiments is defined only by the appended claims, along with the full range of equivalents to which such claims are entitled.

Although specific embodiments have been shown and described herein, it should be appreciated that any arrangement calculated to achieve the same purpose may be substituted for the specific embodiments shown. This application is intended to cover any and all adaptations or variations of various embodiments. Combinations of the above embodiments and other embodiments not specifically described herein, will be apparent to those of skill in the art upon reviewing the above description.

The Abstract is provided to comply with 37 C.F.R. § 1.72(b) and will allow the reader to quickly ascertain the nature of the technical disclosure of this application. It is submitted with the understanding that it will not be used to interpret or limit the scope or meaning of the claims.

In the foregoing description of the embodiments, various features may be grouped together in a single embodiment for the purpose of streamlining the disclosure of this application. This method of disclosure is not to be interpreted as reflecting that the claimed embodiments have more features than are expressly recited in each claim. Rather, as the following claims reflect, inventive subject matter lies in less than all features of a single disclosed embodiment.

What is claimed is:

1. A system for generating an aggregate document comprised of at least one sub-document and for outputting the aggregate document in a printable format, the system comprising a document management system on a first computing device and a user computing system on a second computing device remote from the first computing device and connectable thereto over a network, the document management system on the first computing device having access over a network to a plurality of databases including an aggregate document database, a license database, and a document repository database, each of the first computing device and second computing device having operational thereon software code for effecting instructions for controlling certain aspects of each computing device, the software code on the first computing device being operational at least for controlling hardware components of the first computing device to create a document management system comprising:

a builder subsystem configured to enable a user to manage at least one aggregate document, the builder subsystem comprising:

a graphical user interface generated on the first computing device and displayed on the second computing device for receiving input from the user, the graphical user interface displaying an aggregate document toolbar and a sub-document toolbar;

a sub-document search engine operable on the first computing device in response to user action via the second computing device and the graphical user interface and configured to enable the user to enter criteria to search the document repository database for at least one sub-document, the sub-document search engine being configured to perform a search of the document repository database based upon the user-entered search criteria and to display, via the graphical user interface, at least one sub-document retrieved from the document repository database that satisfies the user-entered search criteria;

an aggregate document generator operable on the first computing device in response to user action via the second computing device and the graphical user interface and configured to enable a user to generate an aggregate document comprised of the at least one sub-document retrieved by the sub-document search engine from the repository database, the aggregate document generator generating a record associated with the aggregate document, the record comprising an identifier unique to the aggregate document;

a sub-document adder operable on the first computing device in response to user action via the second computing device and the graphical user interface and configured to add at least one sub-document selected by the user to the aggregate document in the aggregate document database;

a sub-document remover operable on the first computing device in response to user action via the second computing device and the graphical user interface and configured to remove at least one sub-document from the aggregate document;

an aggregate document editor operable on the first computing device in response to user action via the second computing device and the graphical user interface and configured to enable the user to edit the aggregate document in the aggregate document database so as to enable user-controlled ordering of the at least one sub-document within the aggregate document;

a sub-document editor operable on the first computing device in response to user action via the second computing device and the graphical user interface and configured to enable the user to edit a sub-document document in the document repository;

a sub-document copyright license discoverer operable on the first computing device accessing the license database over the network and configured to determine copyright license information associated with a sub-document that is added to the aggregate document; and a sub-document license flag generator operable on the first computing device and configured to generate at least one license flag from the determined copyright license information associated with the sub-document added to the aggregate document; and an export subsystem configured to export the aggregate document and comprising:

an aggregate document search engine operable on the first computing device in response to user action via the graphical user interface and configured to search for and retrieve at least one aggregate document in the aggregate document database;

an export document generator operable on the first computing device in response to user action via the graphical user interface and configured to generate an export document from the retrieved aggregate document; and a license compliance engine operable on the first computing device in response to the export document generator and configured to determine license compliance status for each sub-document of the export document and to resolve any non-compliance condition for each sub-document of the export document;

wherein, in response to the non-compliance condition not being resolved for each sub-document of the export document, the export subsystem is configured to remove any sub-document from the export document where the non-compliance condition could not be resolved and to insert a place holder in the export document in place of each of the removed sub-documents.

2. The system of claim 1, wherein the sub-document search engine is further configured to enable a user to, via the second computing device and the graphical user interface, search sub-documents by at least one of a sub-document ID, text contained in the sub-document, and name of the sub-document.

3. The system of claim 1, wherein the sub-document adder is further configured to associate a sub-document ID with the aggregate document ID in the aggregate document database.

4. The system of claim 1, wherein the sub-document editor is further configured to create a copy of the sub-document and associate a new sub-document ID with the copy of the sub-document.

5. The system of claim 4, wherein the sub-document editor is further configured to enable a user to, via the second computing device and the graphical user interface, edit the copy of the sub-document.

6. The system of claim 4, wherein the sub-document editor is further configured to add the new sub-document ID to the license database and to associate license flags of the sub-document with the copy of the sub-document so as to indicate that the copy of the sub-document is a derivative version of the sub-document.

7. The system of claim 6, wherein the sub-document editor is further configured to change the sub-document ID in the aggregate document database to the new sub-document ID.

8. The system of claim 1, wherein the aggregate document search engine is further configured search for and retrieve at least one aggregate document in the aggregate document database by one of an aggregate document ID, user ID, sub-documents associated with the aggregate document, and text in an aggregate document.

9. The system of claim 1, wherein the license compliance engine is further configured to resolve any non-compliance condition for each sub-document of the export document by one of adding information to the sub-document, sending, by the first computing device and via the network, notification to one of an owner, author and licensor of the sub-document of use thereof, collecting payment from the user for use of the sub-document, and obtaining permission of use from one of an owner, author and licensor of the sub-document.

* * * * *